(12) United States Patent
Roberts et al.

(10) Patent No.: US 10,355,327 B1
(45) Date of Patent: Jul. 16, 2019

(54) DYNAMIC BATTERY PACK THERMAL MANAGEMENT

(71) Applicant: LOON LLC, Mountain View, CA (US)

(72) Inventors: Jacob Buswell Roberts, San Francisco, CA (US); Sameera Sylvia Ponda, Mountain View, CA (US)

(73) Assignee: Loon LLC, Mountain View, CA (US)

(*) Notice: Subject to any disclaimer, the term of this patent is extended or adjusted under 35 U.S.C. 154(b) by 726 days.

(21) Appl. No.: 14/927,991

(22) Filed: Oct. 30, 2015

(51) Int. Cl.
*H01M 10/60* (2014.01)
*H01M 10/615* (2014.01)
*H01M 10/42* (2006.01)
*H01M 10/633* (2014.01)
*H01M 10/48* (2006.01)

(52) U.S. Cl.
CPC ..... *H01M 10/615* (2015.04); *H01M 10/4285* (2013.01); *H01M 10/486* (2013.01); *H01M 10/633* (2015.04); *H01M 2010/4278* (2013.01)

(58) Field of Classification Search
CPC ........... H01M 10/633; H01M 10/4285; H01M 10/486; H01M 10/615
See application file for complete search history.

(56) References Cited

U.S. PATENT DOCUMENTS

| | | | |
|---|---|---|---|
| 5,215,834 A | 6/1993 | Reher et al. | |
| 6,054,842 A | 4/2000 | Verzwyvelt et al. | |
| 8,395,358 B2 | 3/2013 | Gaben et al. | |
| 8,410,760 B2 | 4/2013 | Formanski et al. | |
| 2013/0093399 A1* | 4/2013 | Svensson | H02J 7/047 320/150 |
| 2014/0091772 A1 | 4/2014 | Del Core | |
| 2014/0328659 A1 | 11/2014 | Marji | |

* cited by examiner

*Primary Examiner* — Ula C Ruddock
*Assistant Examiner* — Frank A Chernow
(74) *Attorney, Agent, or Firm* — Botos Churchill IP Law

(57) ABSTRACT

An example system includes a battery, a controllable heating element arranged to heat the battery, a load coupled to the battery, and a controller configured to: determine a current temperature of the battery; determine a SOC of the battery; based on the current temperature of the battery, select a setpoint profile from a plurality of setpoint profiles for the battery, where each of the plurality of setpoint profiles has a temperature association, and where each of the plurality of profiles comprises one or more temperature setpoints; based on a comparison of the current SOC and a SOC of the selected setpoint profile, determine a current temperature setpoint from the one or more temperature setpoints of the selected setpoint profile; and in response to determining the current temperature setpoint of the battery, cause the current temperature of the battery to adjust according to the current temperature setpoint of the battery.

14 Claims, 11 Drawing Sheets

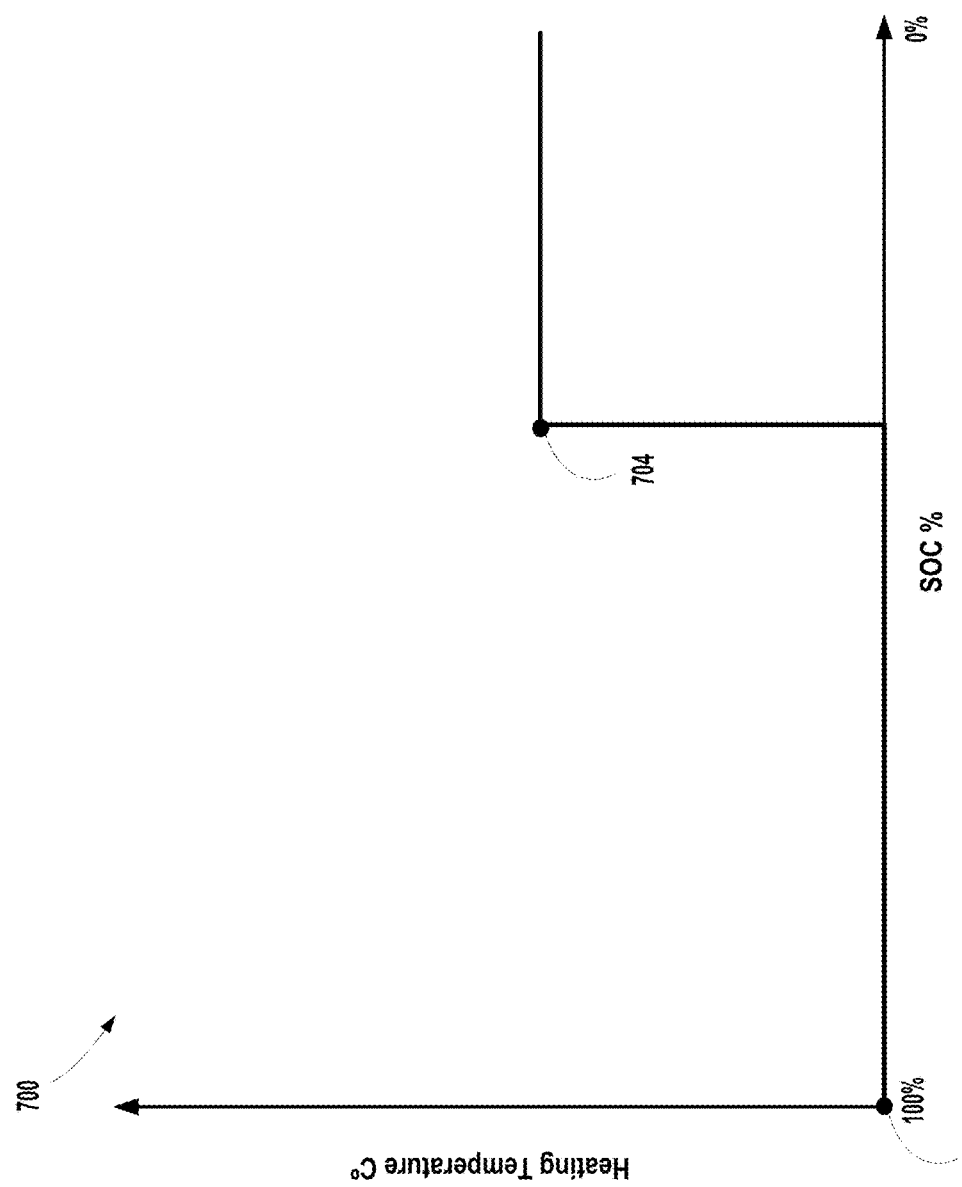

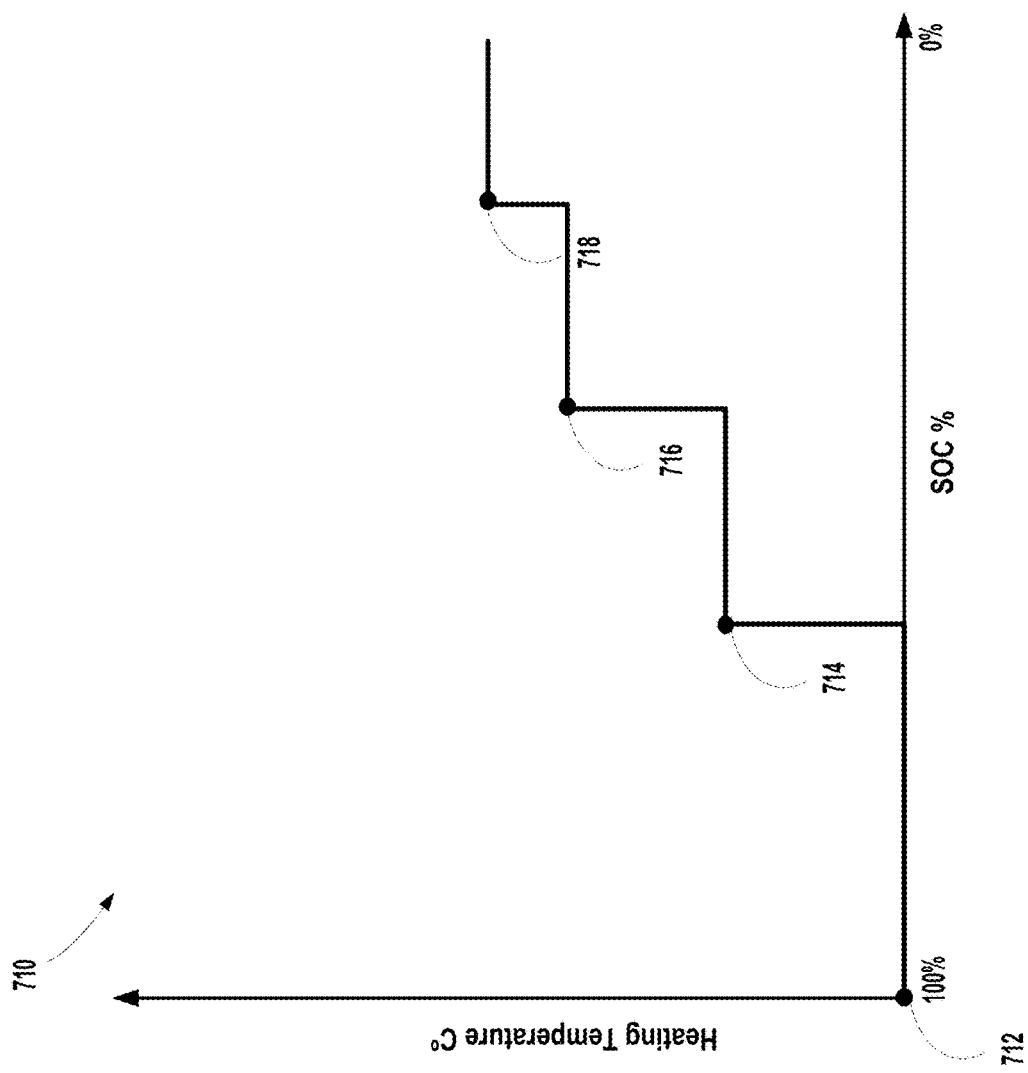

DYNAMIC BATTERY PACK THERMAL MANAGEMENT

BACKGROUND

Unless otherwise indicated herein, the materials described in this section are not prior art to the claims in this application and are not admitted to be prior art by inclusion in this section.

Computing devices such as personal computers, laptop computers, tablet computers, smartphones, wearable computing devices, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

For many reasons, including the limitations of batteries in harsh weather conditions, solutions for increasing the efficiency of batteries are desirable. Example battery systems disclosed herein use a heating element to adjust the temperature of their battery according to a setpoint profile for the battery. Adjusting the temperature of the battery according to the setpoint profile may help to increase the efficiency of the battery.

In an aspect, a system may include a battery, a controllable heating element arranged to heat the battery, a load coupled to the battery, and a controller configured to: determine a current temperature of the battery; determine a current state of charge (SOC) of the battery; based at least on the current temperature of the battery, select a setpoint profile from a plurality of setpoint profiles for the battery, where each of the plurality of setpoint profiles has a temperature association, where each of the plurality of profiles specifies heating temperature as a function of SOC, and where each of the plurality of profiles comprises one or more temperature setpoints; based on a comparison of the current SOC and a SOC of the selected setpoint profile, determine a current temperature setpoint from the one or more temperature setpoints of the selected setpoint profile; and in response to determining the current temperature setpoint of the battery, cause the current temperature of the battery to adjust according to the current temperature setpoint of the battery.

In another aspect a method is provided that includes determining a range of operating temperatures of a battery, where the range of operating temperatures comprises a plurality of benchmark temperatures; generating a plurality of setpoint profiles, where each of the setpoint profiles is associated with one of the plurality of benchmark temperatures; generating one or more temperature setpoints for each of the plurality of setpoint profiles, where generating each of the one or more temperature setpoints includes: comparing an energy required to heat the battery from an initial temperature to a target temperature with an extractable energy gained by heating the battery from the initial operating temperature to the target temperature, where each of the initial temperature and the target temperature is one of the operating temperatures of the battery.

In a further aspect, a method is provided that includes determining a current temperature of a battery; determining a current state of charge (SOC) of the battery; based at least on the current temperature of the battery, selecting a setpoint profile from a plurality of setpoint profiles for the battery, where each of the plurality of setpoint profiles has a temperature association, where each of the plurality of setpoint profiles specifies heating temperature as a function of SOC, and where each of the plurality setpoint profiles comprises one or more temperature setpoints; based on a comparison of the current SOC and a SOC of the selected setpoint profile, determining a current temperature setpoint from the one or more temperature setpoints of the selected temperature profile; and in response to determining the current temperature setpoint of the battery, causing the current temperature of the battery to adjust according to the current temperature setpoint of the battery.

BRIEF DESCRIPTION OF THE DRAWINGS

FIGS. 7A to 7B, 8, and 9 illustrate setpoint profiles, according to an example embodiment.

DETAILED DESCRIPTION

Figure 1:
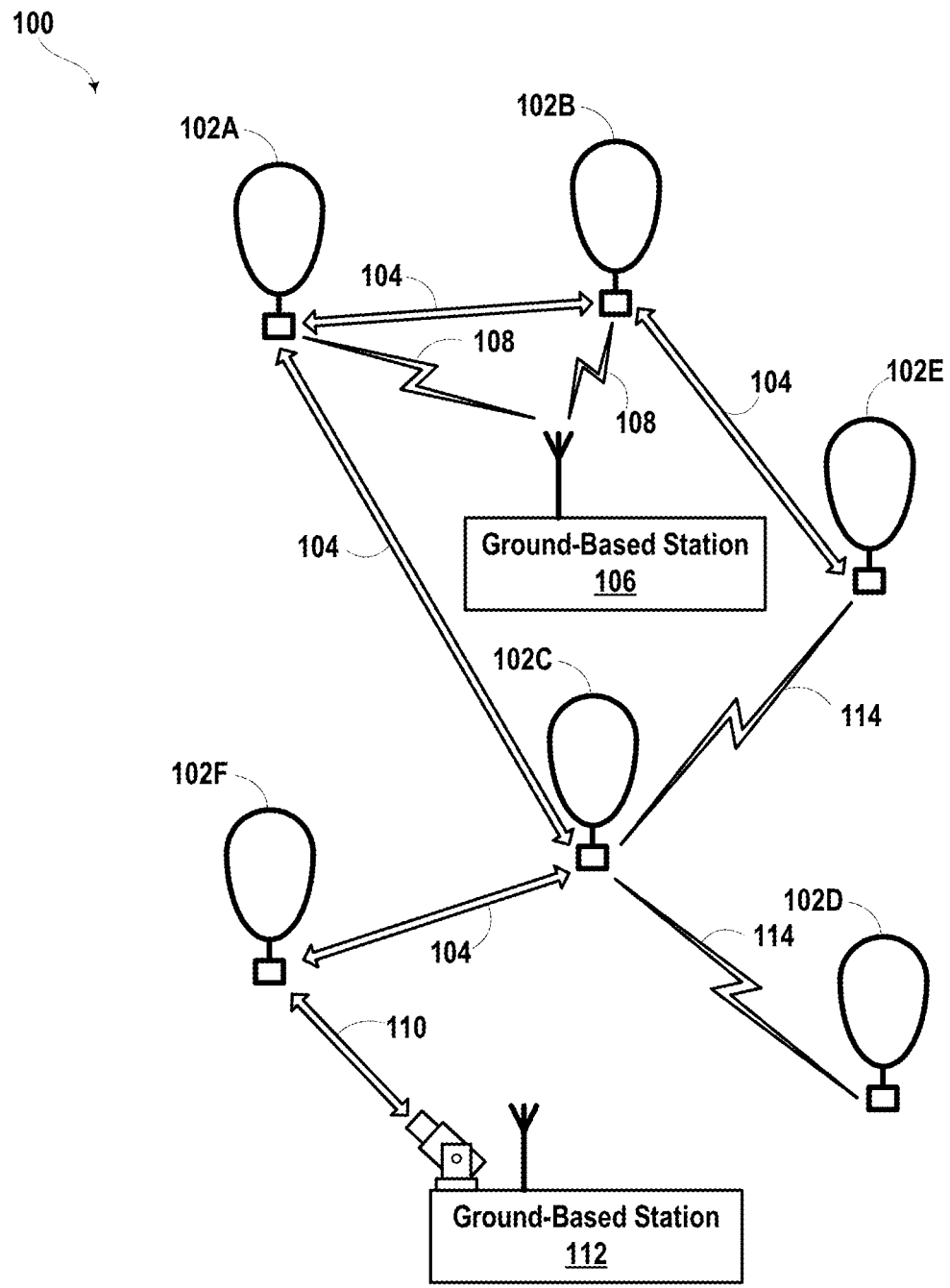
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

In the stratosphere (e.g. at an altitude of around 10 km or greater), the air temperature is generally between −80° C. to −20° C. At such altitudes, the density of air is approximately 7% of the air density at sea level. Some of a balloon's components may not perform as well in these stratospheric conditions, as they do at lower altitudes. The efficiency of the balloon's battery, in particular, may suffer when operating under stratospheric weather conditions. Furthermore, the balloon may be weight constrained. As a result of the balloon's weight constraints, battery insulation may be limited, which may cause the balloon battery's efficiency to deteriorate further.

The extraction efficiency of a battery can be measured as the ratio of: (a) the energy that is available for extraction from the battery given its current charge status and actual operating conditions (referred to as the "available extractable energy") to (b) the maximum energy that can be extracted energy from the battery at its current charge status according to the battery's stated specifications (referred to as the "maximum extractable energy"). For example, a fully charged battery's available extractable energy may be only 85% of the battery's maximum extractable energy when fully charged.

Furthermore, a battery's available extractable energy may be affected by various operating parameters. Operating parameters such as temperature, state of charge (SOC), current, and/or voltage may affect the battery's available extractable energy. Therefore, the available extractable energy, and thus the extraction efficiency of the battery, may change as the battery's operating parameters change.

Specifically, a battery's voltage may change as a function of temperature, as the rate of chemical reactions that govern the battery's operation depends on temperature. Changing the rate of the battery's chemical reactions may change the battery's voltage. Within a battery's rated operating temperatures, the rate of the battery's chemical reactions increases with increasing temperature, and thus the battery's voltage also increases with increasing temperature. A battery's voltage may also be a function of the state of charge (SOC) of the battery; as the SOC decreases, the battery's voltage decreases.

Further, a battery's available charge may also change as a function of temperature, since the available fraction of the battery's maximum charge is a function of temperature. Generally, increasing the temperature of the battery increases the fraction of the battery's maximum charge available for discharge.

Therefore, a battery's extraction efficiency may change as the temperature of the battery changes due to external weather conditions. A low battery temperature, in particular, may deteriorate the extraction efficiency of the battery as the available extractable energy may severely decrease at low temperatures. However, an external heat source may provide heat to the battery in order to increase its temperature; thereby increasing its extraction efficiency.

Nevertheless, it may be economically disadvantageous to keep the temperature of the battery elevated such that the battery is operating at an optimal temperature at all times, as it may require more energy to heat the battery up to the optimal temperature than the extractable energy gained as a result of raising the battery's temperature to the optimal temperature. Some systems may heat the battery at a constant temperature that is less than the optimal temperature. However, even this configuration may not be economically advantageous, as during certain periods of battery discharge, the amount of energy discharged from the heated battery may be less than the amount of energy that is spent to extract it.

The present disclosure may relate to systems and methods for increasing a battery's extraction efficiency. Specifically, by dynamically adjusting the battery's temperature, the battery's extraction efficiency may be increased. Further, the battery system may be installed on a high-altitude aerial vehicle, which may experience cold temperatures.

In an example embodiment, a method for dynamically adjusting a battery's temperature may entail generating a setpoint profile for the battery, which specifies heating temperatures (called temperature setpoints) at which to heat the battery. The setpoint profile may be generated by executing a cost-benefit analysis in order to determine whether or not to spend energy to increase the temperature of the battery from an initial temperature to a target temperature. The analysis may result in a determination to increase the temperature of the battery if the extractable energy gained by increasing the temperature to the target temperature is greater than the heating energy required to heat the battery.

In another example embodiment, a battery system, which includes a heating element, may be operable to adjust its battery's operating temperature according to a setpoint profile for the battery. The system may include a controller that may generate the setpoint profile for the battery based on current battery conditions (i.e. battery type, temperature, SOC, etc.). The controller may also be operable to retrieve the setpoint profile for the battery from a memory included in the battery system. The controller may then increase the temperature of the battery to a target temperature by activating the heating element.

In some embodiments, the controller may periodically run the cost-benefit analysis in real-time to determine whether to increase the temperature of the battery. The controller may also monitor the status of the battery, such that the controller may carry out the analysis if certain values of the battery fall below a predefined threshold. For example, the controller may execute the analysis if the temperature falls below a predefined value. In other examples, the controller may execute the analysis if the SOC of the battery falls below a predefined value. For instance, the predefined value SOC may be near a low SOC of the battery.

Furthermore, the cost-benefit analysis, which is either executed to generate a setpoint profile or executed in real-time, may take into consideration other factors that may affect the voltage of the battery, and thus the extraction efficiency of the battery. For example, larger loads derive higher currents from a battery, which increases the internal resistance of the battery. Thus, the voltage of a battery may drop when the battery is connected to a larger load.

2. Example Balloon Networks

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 2.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

2b) Example Balloon Configuration

Figure 2:
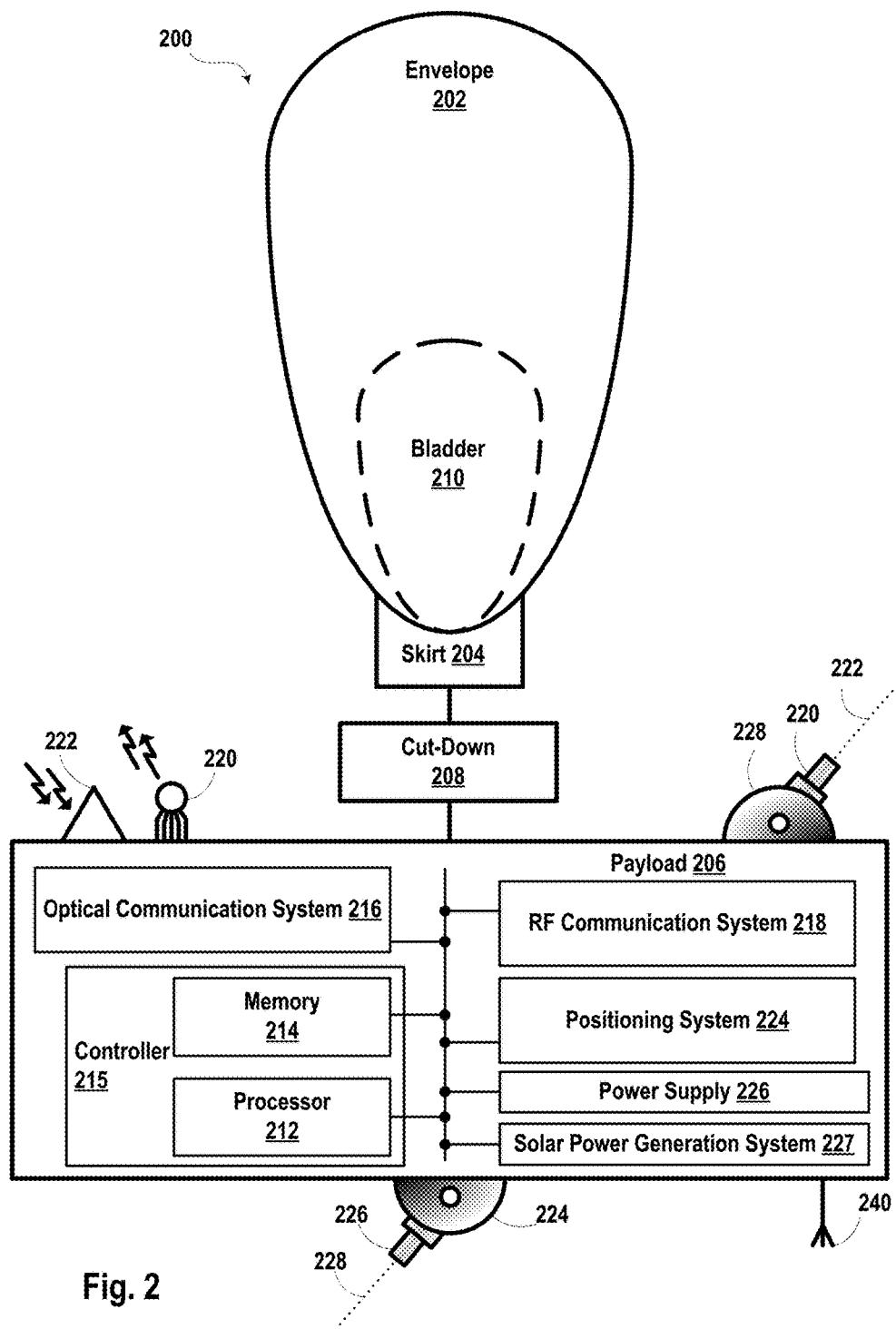
FIG. 2 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 17 km and 25 km. FIG. 2 shows a high-altitude balloon 200, according to an example embodiment. As shown, the balloon 200 includes an envelope 202, a skirt 204, a payload 206, and a cut-down system 208, which is attached between the envelope 202 and payload 204.

The envelope 202 and skirt 204 may take various forms, which may be currently well-known or yet to be developed. For instance, the envelope 202 and/or skirt 204 may be made of materials including metalized Mylar or BoPet. Additionally or alternatively, some or all of the envelope 202 and/or skirt 204 may be constructed from a highly-flexible latex material or a rubber material such as chloroprene. Other materials are also possible. Further, the shape and size of the envelope 202 and skirt 204 may vary depending upon the particular implementation. Additionally, the envelope 202 may be filled with various different types of gases, such as helium and/or hydrogen. Other types of gases are possible as well.

The payload 206 of balloon 200 may include a processor 212 and on-board data storage, such as memory 214. The memory 214 may take the form of or include a non-transitory computer-readable medium. The non-transitory computer-readable medium may have instructions stored thereon, which can be accessed and executed by the processor 212 in order to carry out the balloon functions described herein. Thus, processor 212, in conjunction with instructions stored in memory 214, and/or other components, may function as a controller 215 of balloon 200.

The payload 206 of balloon 200 may also include various other types of equipment and systems to provide a number of different functions. For example, payload 206 may include an optical communication system 216, which may transmit optical signals via an ultra-bright LED system 220, and which may receive optical signals via an optical-communication receiver 222 (e.g., a photodiode receiver system). Further, payload 206 may include an RF communication system 218, which may transmit and/or receive RF communications via an antenna system 240.

The payload 206 may also include a power supply 226 to supply power to the various components of balloon 200. The power supply 226 could include a rechargeable battery. In other embodiments, the power supply 226 may additionally or alternatively represent other means known in the art for producing power. In addition, the balloon 200 may include a solar power generation system 227. The solar power generation system 227 may include solar panels and could be used to generate power that charges and/or is distributed by the power supply 226.

The payload 206 may additionally include a positioning system 224. The positioning system 224 could include, for example, a global positioning system (GPS), an inertial navigation system, and/or a star-tracking system. The positioning system 224 may additionally or alternatively include various motion sensors (e.g., accelerometers, magnetometers, gyroscopes, and/or compasses).

The positioning system 224 may additionally or alternatively include one or more video and/or still cameras, and/or various sensors for capturing environmental data.

Some or all of the components and systems within payload 206 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 200 includes an ultra-bright LED system 220 for free-space optical communication with other balloons. As such, optical communication system 216 may be configured to transmit a free-space optical signal by modulating the ultra-bright LED system 220. The optical communication system 216 may be implemented with mechanical systems and/or with hardware, firmware, and/or software. Generally, the manner in which an optical communication system is implemented may vary, depending upon the particular application. The optical communication system 216 and other associated components are described in further detail below.

In a further aspect, balloon 200 may be configured for altitude control. For instance, balloon 200 may include a variable buoyancy system, which is configured to change the altitude of the balloon 200 by adjusting the volume and/or density of the gas in the balloon 200. A variable buoyancy system may take various forms, and may generally be any system that can change the volume and/or density of gas in the envelope 202.

In an example embodiment, a variable buoyancy system may include a bladder 210 that is located inside of envelope 202. The bladder 210 could be an elastic chamber configured to hold liquid and/or gas. Alternatively, the bladder 210 need not be inside the envelope 202. For instance, the bladder 210 could be a rigid bladder that could be pressurized well beyond neutral pressure. The buoyancy of the balloon 200 may therefore be adjusted by changing the density and/or volume of the gas in bladder 210. To change the density in bladder 210, balloon 200 may be configured with systems and/or mechanisms for heating and/or cooling the gas in bladder 210. Further, to change the volume, balloon 200 may include pumps or other features for adding gas to and/or removing gas from bladder 210. Additionally or alternatively, to change the volume of bladder 210, balloon 200 may include release valves or other features that are controllable to allow gas to escape from bladder 210. Multiple bladders 210 could be implemented within the scope of this disclosure. For instance, multiple bladders could be used to improve balloon stability.

In an example embodiment, the envelope 202 could be filled with helium, hydrogen or other lighter-than-air material. The envelope 202 could thus have an associated upward buoyancy force. In such an embodiment, air in the bladder 210 could be considered a ballast tank that may have an associated downward ballast force. In another example embodiment, the amount of air in the bladder 210 could be changed by pumping air (e.g., with an air compressor) into and out of the bladder 210. By adjusting the amount of air in the bladder 210, the ballast force may be controlled. In some embodiments, the ballast force may be used, in part, to counteract the buoyancy force and/or to provide altitude stability.

In other embodiments, the envelope 202 could be substantially rigid and include an enclosed volume. Air could be evacuated from envelope 202 while the enclosed volume is substantially maintained. In other words, at least a partial vacuum could be created and maintained within the enclosed volume. Thus, the envelope 202 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 202 could be a first color (e.g., black) and/or a first material from the rest of envelope 202, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 202 as well as the gas inside the envelope 202. In this way, the buoyancy force of the envelope 202 may increase. By rotating the balloon such that the second material is facing the sun, the temperature of gas inside the envelope 202 may decrease. Accordingly, the buoyancy force may decrease. In this manner, the buoyancy force of the balloon could be adjusted by changing the temperature/volume of gas inside the envelope 202 using solar energy. In such embodiments, it is possible that a bladder 210 may not be a necessary element of balloon 200. Thus, in various contemplated embodiments, altitude control of balloon 200 could be achieved, at least in part, by adjusting the rotation of the balloon with respect to the sun.

Further, a balloon 206 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 200 also includes a cut-down system 208. The cut-down system 208 may be activated to separate the payload 206 from the rest of balloon 200. The cut-down system 208 could include at least a connector, such as a balloon cord, connecting the payload 206 to the envelope 202 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 206 away from the envelope 202.

The cut-down functionality may be utilized anytime the payload needs to be accessed on the ground, such as when it is time to remove balloon 200 from a balloon network, when maintenance is due on systems within payload 206, and/or when power supply 226 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

3. Example Methods and Systems

Figure 3:
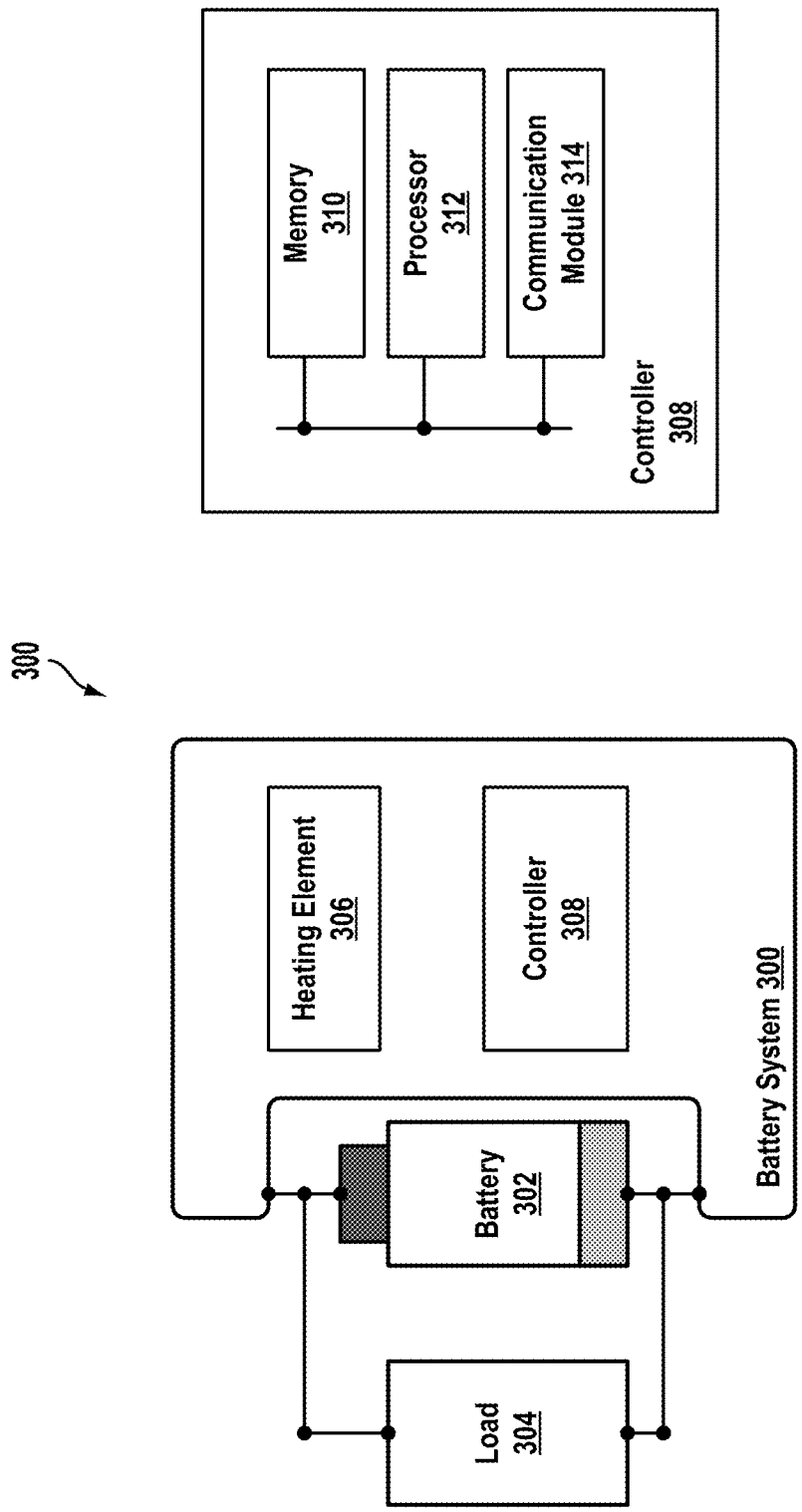
FIG. 3 is a simplified block diagram illustrating a battery system, according to an example embodiment.

FIG. 3 illustrates a battery system 300 that may be included in a high-altitude balloon, according to an exemplary embodiment. Note, however, that the battery system 300 is not limited to being installed in a high-altitude balloon. The system 300 may be included in systems and applications that may require battery power either as a primary power source or as a backup power source. For example, the system 300 may be included as a backup power source in a micro-grid, which may be installed in a region that experiences harsh weather conditions such as low temperatures. In another example, the system 300 may be included either as the primary power source or as a supplemental power source in a vehicle. Within examples, the vehicle may be an electric vehicle.

The battery system 300 includes a battery 302, a heating element 306, and a controller 308. As illustrated, a load 304 is coupled to the battery system 300. The load 304 may be configured to receive electrical power from the battery 302. In embodiments, the load 304 may be one or more of the various components of balloon 200.

Furthermore, it should be understood that FIG. 3 illustrates the battery 302 in a "single cell" configuration and that other configurations are possible. For example, the battery 302 may be connected in a parallel and/or series configuration with similar or different batteries or circuits. In other words, several instances of the battery 302 may be connected in series to in an effort to increase the open circuit voltage of the battery, for instance. Similarly, several instances of the battery 302 may be connected in parallel to increase the capacity (ampere hours). In other embodiments, the battery 302 may be connected in configurations involving other batteries. In an example embodiment, a plurality of instances of the battery 302 may be configured in a planar array. Other arrangements and configurations are possible.

Within examples, the battery 302 may be a rechargeable battery. Accordingly, the battery 302 may be any one of a lithium-ion battery, a lead-acid battery, a flow battery, a nickel-cadmium battery, or any other type of rechargeable battery. In some embodiments, battery 302 may be recharged by receiving power from solar power generation system 227.

In some examples, the controller 308 and the heating element 306 may be powered by the battery 302. In other examples, the controller 308 and the heating element 306 may be powered by a power source other than the battery 308. For example, when sunlight reaches balloon 200, the heating element 306 and the controller 308 may be powered directly by the solar power generation system 227, to preserve the charge of the battery 302.

As illustrated in FIG. 3, the controller 308 includes a memory 310 and a processor 312. In some embodiments, the controller 308 may be incorporated into the battery system 300. However, the controller 308 may alternatively or additionally be disposed separate from the battery system 300. For example, the controller 308 may the same controller as controller 215 of payload 206. Furthermore, the controller memory 310 may be configured to contain instructions and the processor 312 may be configured to execute the instructions to perform various operations.

Within example embodiments, the controller 308 may be a computing system with processor(s) and a non-transitory computer readable medium with program instructions to carry out operations carry out operations such as causing the battery system 300 to adjust the temperature of the battery 302, in order to increase the battery's extraction efficiency. The extraction efficiency of a battery can be measured as the ratio of: (a) the energy that is available for extraction from the battery given its current charge status and actual operating conditions (referred to as the "available extractable energy") to (b) the maximum energy that can be extracted energy from the battery at its current charge status according to the battery's stated specifications (referred to as the "maximum extractable energy"). In example embodiments, the battery 302's temperature may be modified to adjust the amount of energy that may be extracted from the battery 302; thereby increasing the battery's extraction efficiency. For example, under certain conditions the extraction efficiency of the battery may be greater than 100%.

More specifically, the battery 302 may have a maximum capacity, which may be the maximum amount of charge that may be stored in the battery 302 under certain conditions. However, in some embodiments only a fraction of the maximum charge may be available to the battery 302 to discharge to the load 304. The available fraction of maximum charge may vary at different operating temperatures, and thus may be represented as a function of temperature.

For example, the battery 302 operating at a first temperature may have a first available fraction of the maximum battery charge. Thus, when the battery 302 is operating at the first temperature, it may have a "full charge" state when the charge of the battery 302 is equivalent to the first available fraction of the maximum charge. As the available fraction of maximum charge is a function of temperature, the controller 308 may assign different "full charge" states and different "minimum charge" states for the battery 302 at different operating temperatures. Generally, increasing the operating temperature of the battery 302 may increase the available fraction of the battery's maximum charge. In some examples, the battery 302 may have one or more operating temperatures at which the battery may have a "full charge" state where the available charge is equivalent to the maximum charge of the battery.

Furthermore, the voltage of the battery 302 may also govern the amount of extractable energy from the battery 302. Similar to the available fraction of maximum charge, the voltage of the battery 302 may also be represented as a function of temperature. Specifically, the voltage may vary as a function of temperature, due the chemical reactions that produce the battery's open circuit voltage depending on the operating temperature. In some instances, the rate of the chemical reactions that occur in the battery may be governed by the Arrhenius equation $k = Ae^{-\frac{E_a}{RT}}$, where k is the reaction rate constant, and T is the temperature in kelvins (K). As such, the rate of the chemical reaction that occurs in a battery may exponentially depend on the temperature of the battery; as the temperature of the battery increases, the reaction rate increases. A higher rate of chemical reactions in a battery may produce a higher open circuit voltage.

Figure 4:
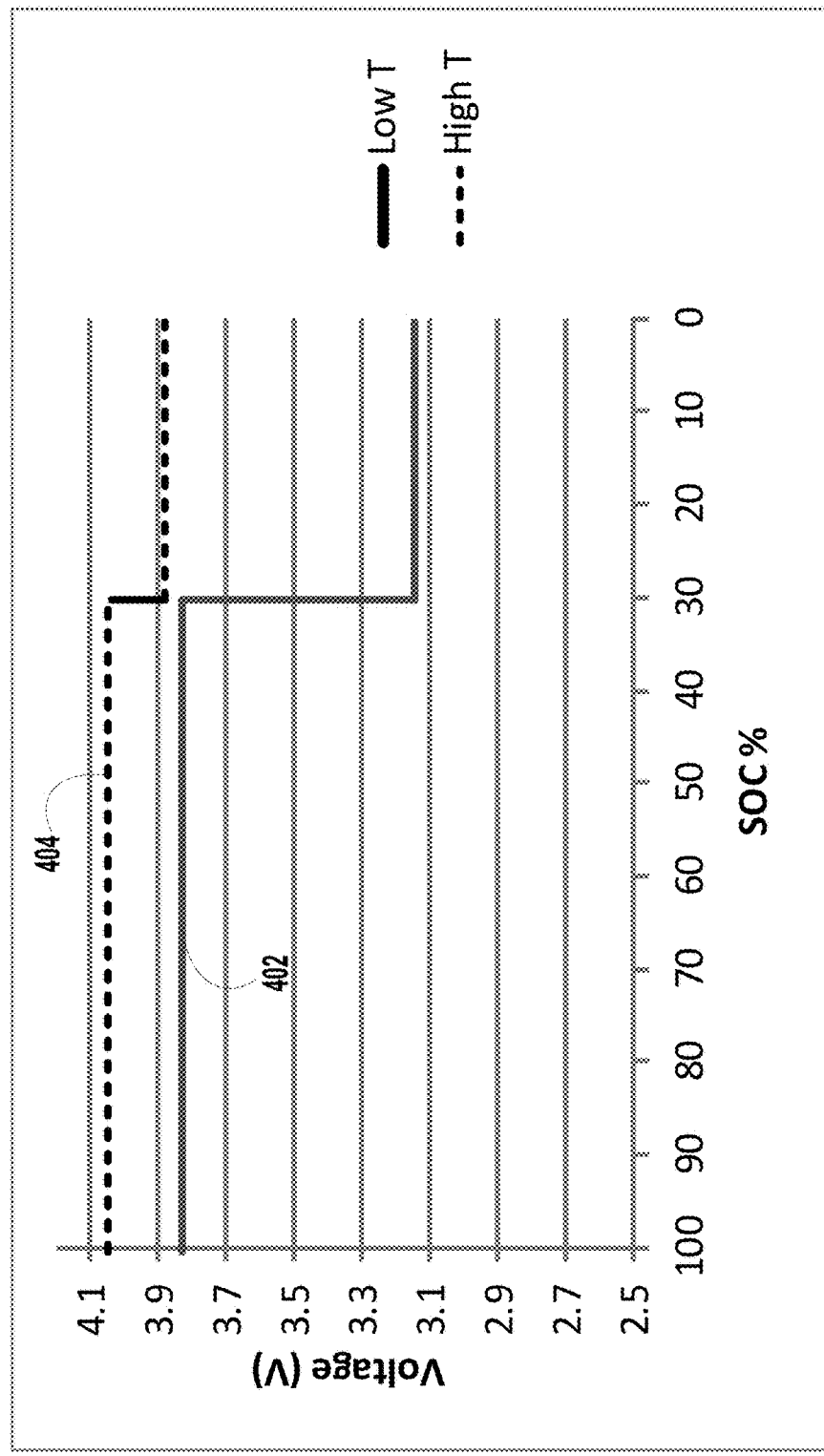
FIGS. 4 and 5 are voltage vs SOC graphs for an example battery, according to an example embodiment.

FIG. 4 illustrates a voltage vs. state of charge (SOC) graph of two identical batteries operated at two different temperatures, according to an exemplary embodiment. The SOC of a battery has units of percentage points (0%=empty; 100%=full). As shown in FIG. 4, the battery operating at a higher temperature may have a higher voltage than the identical battery operating at a lower temperature. Further, as shown near the 30% SOC in FIG. 4, the battery that is operating at the lower temperature suffers from a larger voltage drop as the SOC of the battery decreases. Thus, the battery operating at the higher temperature may extract a larger fraction of the maximum extractable energy than the battery operating at the lower temperature.

Figure 5:
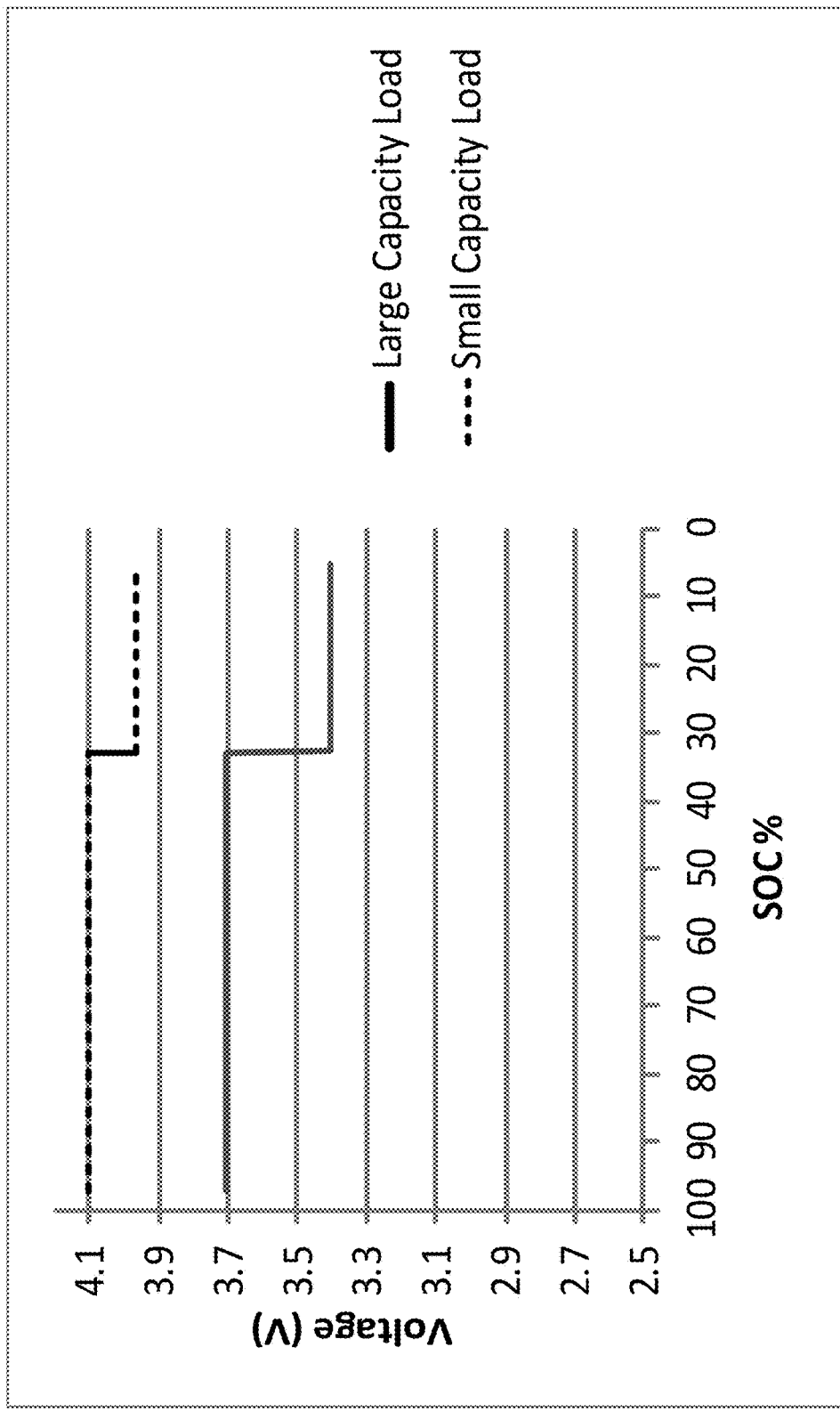

The voltage of the battery 302 may also depend on factors other than the operating temperature. For example, the battery's voltage may depend on the capacity ("size") of the load 304. Larger capacity loads demand higher current from a battery than smaller capacity loads. Generally, increasing the current supplied by a battery may decrease the voltage of the battery. FIG. 5 illustrates the voltage of two identical batteries supplying power to two different loads, according to an exemplary embodiment. As illustrated, the battery coupled to the small capacity load will have a higher voltage than a battery coupled to the large capacity load. Also, the battery operating with a higher voltage may be able to supply more energy to the load than the battery operating with a smaller voltage.

Figure 6:
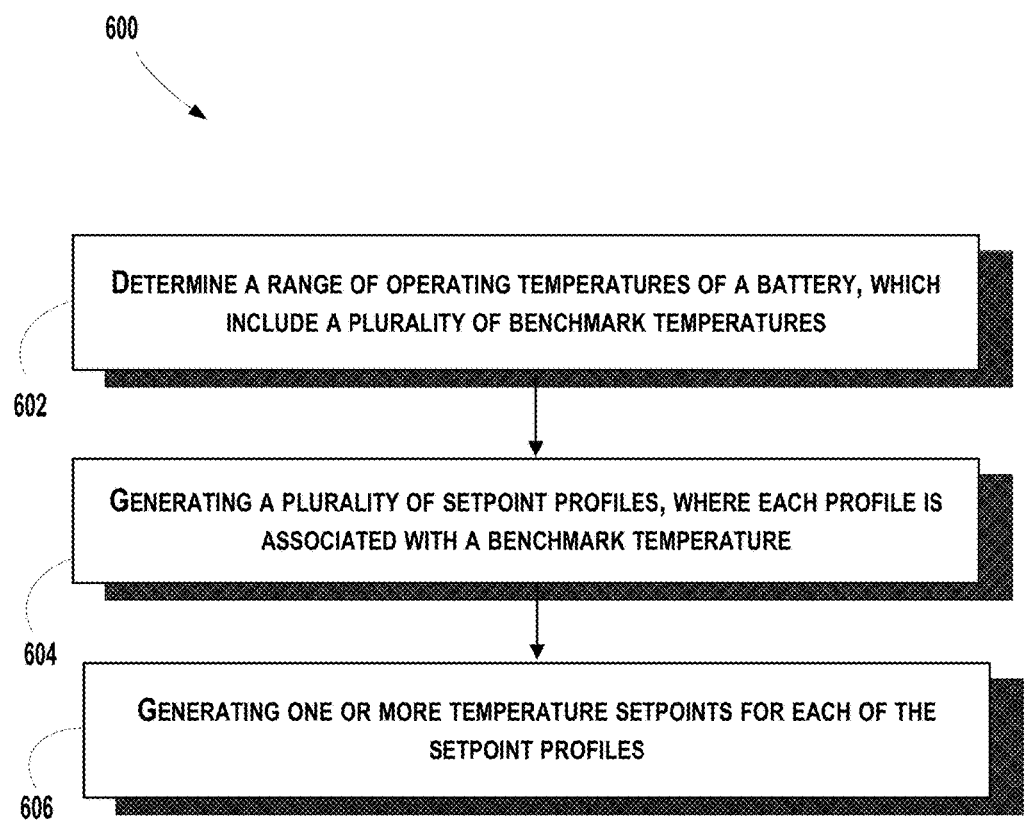
FIG. 6 illustrates a method, according to an example embodiment.

Furthermore, the battery 302's voltage may be also a function of the SOC the battery 302. As illustrated in FIGS. 4 and 6, a battery's voltage may decrease as the SOC of the battery decreases. In both figures, the battery experiences a voltage drop near 30% SOC. The rate at which a battery's voltage decreases as a function of the SOC of the battery may depend on the chemical composition of the battery. Further, as explained above, a battery operating at a low temperature may experience a larger voltage drop as the SOC decreases than a battery operating at a higher temperature. As such, different battery types may have different discharge curves, which illustrate the relationship between the voltage and the SOC of a battery.

The relationship between the voltage and the SOC of a battery may be roughly known based on the battery's type. However, a full characterization of the battery may provide a more accurate model of the relationship between the voltage and the SOC of a battery. The more accurate model provides for more accurate determination of the voltage at a specific operating condition.

For example, to characterize a battery, X different cells of the battery may be chosen. Each of the X cells may be assigned one of N different temperatures and one of M different currents, at which to be discharged at. Each cell may then be fully charged at a chosen "nominal" temperature. Each cell is then discharged, while each cell is coupled to a constant load, at its assigned temperature and assigned current until the battery is empty. This results in a set of discharge curves for the battery at a range of temperatures, currents, and SOCs. The discharge curves may be used to accurately determine the battery's voltage at specific operating conditions. Alternatively and/or additionally, each battery may be discharged with time varying loads to determine a battery's relaxation properties.

Furthermore, when a battery is subject to varying environmental conditions, such as varying temperature, the battery may have a varying amount of extractable energy. For example, a battery may be configured to supply a specified amount of energy to a load. However, due to a decrease in the temperature of the battery, the battery may not be able to supply the specified energy to the load. Additionally, when a battery is subject to low temperatures, the extraction efficiency of the battery may not be very high, as only a small fraction of the maximum extractable energy is available for discharge.

Accordingly, battery system 300 may be operable to adjust the temperature of the battery 302 to increase the available extractable energy from the battery. Within examples, the battery system 300 may employ a setpoint profile for the battery 302, in order to determine the temperature at which to operate the battery 302. A setpoint profile may specify one or more operating temperatures, called temperature setpoints, at which to operate the battery 302. In other embodiments, a setpoint profile may specify temperature setpoints for the heating temperature that is applied to the battery 302.

FIG. 6 illustrates a flowchart showing a method 600 for generating one or more setpoint profiles for a battery, according to an exemplary embodiment. The blocks or steps may be carried out individually or in combination. The blocks or steps may be carried out in any order and/or in series or in parallel. Further, blocks or steps may be omitted or added to method 600.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 6. Where used, program code can be stored on any type of computer-readable medium, for example, such as a storage device including a disk or hard drive.

In addition, each block of the flowchart shown in FIG. 6 may represent circuitry that is wired to perform the specific logical functions in the process. Unless specifically indicated, functions in the flowchart shown in FIG. 6 may be executed out of order from that shown or discussed, including substantially concurrent execution of separately described functions, or even in reverse order in some examples, depending on the functionality involved, so long as the overall functionality of the described method is maintained.

As shown by block 602, method 600 involves a system determining a range of operating temperatures of a battery. The system may be similar or identical to system 300, and the battery may be similar or identical to battery 302, as illustrated and described in reference to FIG. 3. Further, the range of operating temperatures of the battery may depend on the environment that the battery is installed in. For example, a battery installed in a balloon flying in the stratosphere may have a range of operating temperatures from −80° C. to 20° C. Other ranges of operating temperatures are also possible.

Further, the determined range of operating temperatures may include a plurality of benchmark temperatures. Within examples, the benchmark temperatures may be an arithmetic sequence of temperatures that span the range of operating temperatures. For example, the benchmark temperatures may be an arithmetic sequence with a common difference of 4. In the example where the range of operating temperatures of the battery spans from −80° C. to 20° C., the benchmark temperatures may be −80° C., −75° C., −70° C., . . . , 0° C., 5° C., . . . , 20° C. Other sequences of benchmark temperatures are also possible.

As shown by block 604, method 600 further involves generating a plurality of setpoint profiles, where each profile is associated with a benchmark temperature. Further, as shown by block 606, method 600 finally involves generating one or more temperature setpoints for each of the setpoint profiles.

More specifically, as explained above, the operating temperature of the battery may affect the amount of extractable energy from the battery. For instance, a battery may be operating at an initial temperature, which is within the range of the determined operating temperatures, and may have an initial extractable energy. In some instances, the initial temperature may be a temperature that is not the maximum operating temperature in the determined temperature range. Accordingly, and as explained above, increasing the initial temperature to a target operating temperature (also within the determined range of operating temperatures) may increase the extractable energy of the battery, as at least one of the available battery charge or the battery voltage may increase.

However, increasing the temperature of the battery, using the heating element 306 for instance, may require a heating energy. In some examples, the heating energy may be greater than the amount of extractable energy gained by increasing the temperature from the initial operating temperature to the target operating temperature. In such examples, the system may determine that the battery may operate less efficiently by increasing the temperature to the target operating temperature, as the battery may spend more energy to increase the temperature of the battery than the extractable energy gained by increasing the temperature of the battery.

Conversely, in some examples, the heating energy may be less than the extractable energy gained by increasing the temperature from the initial operating temperature to the target operating temperature. Accordingly, in such examples, the system may determine that the battery may operate more efficiently by increasing the temperature to the target operating temperature, as the battery may spend less energy to increase the temperature of the battery than the extractable energy gained by increasing the temperature of the battery.

As such, the system may carry out a cost-benefit analysis of gained extractable energy vs. heating energy for increasing the temperature of the battery from an initial temperature to a target temperature. Note that, as explained above, the voltage of the battery (and thus the extractable energy) may also be a function of the SOC of the battery. As such, the cost-benefit analysis may be carried out for a battery at different states of charge. Therefore, the system may perform the cost-benefit analysis at one or more states of charge. More specifically, a temperature setpoint is established to be equivalent to a target temperature at each SOC where the system determines that battery may operate more efficiently by adjusting the initial temperature to the target temperature. In other embodiments, a temperature setpoint is established to be equivalent to the heating temperature that is applied to the battery to increase its temperature to the target temperature.

Accordingly, the system may establish one or more temperature setpoints, at different states of charge, to generate a setpoint profile for the battery. However, the battery may have a different initial voltage, charge, and discharge curves at the initial operating temperature. Thus, a battery may respond differently to an increase in temperature, depending on the initial temperature of the battery. As such, the system may generate a plurality of setpoint profiles for a battery, where each profile corresponds to a different initial temperature. For example, the system may use the plurality of benchmark temperatures as the initial temperatures, and may therefore generate a setpoint profile associated with each benchmark temperature.

FIG. 7 illustrates two setpoint profiles for a battery, according to an exemplary embodiment. The battery may be similar or identical to battery 302, as illustrated and described in reference to FIG. 3. Further, each setpoint profile may correspond to a different benchmark temperature of the battery. As shown in FIG. 7 (and later in FIGS. 8 and 9), a setpoint profile may include one or more temperature setpoints on a Heating Temperature vs. SOC plot. As such, a temperature setpoint on the SOC axis (i.e. Heating Temperature=0°, represents the temperature of the battery without any external heating applied. In other examples, a setpoint profile may include one or more temperature setpoints on a Battery Temperature vs. SOC plot (not illustrated).

FIG. 7A illustrates a setpoint profile for the first benchmark temperature of the battery. As illustrated, the setpoint profile has two temperature setpoints 702 and 704. As explained above, the setpoint profile may be generated by performing a cost-benefit analysis of the extractable energy gain vs. the heating energy at a SOC of the battery.

As an example, the battery operating at the first benchmark temperature (initial temperature) may have the voltage vs. SOC curve 402 of FIG. 4. Further, as illustrated, the battery may experience a drop of voltage at a SOC of 30%, and therefore may experience a drop in extraction efficiency at 30% SOC. Curve 404 of FIG. 4 illustrates a voltage vs. SOC for the battery operating at a second temperature, which is a higher temperature than the initial temperature. The system may carry out a cost-benefit analysis of increasing the temperature from the initial temperature to the target temperature (the second temperature). The result of the analysis may be that when the battery has a 100% SOC to a 30% SOC, the extractable energy gained from increasing the temperature is less than the heating energy required to increase the temperature. Accordingly, the first temperature setpoint 702 is established at a 0° C. heating (i.e. the heating element is not activated). As illustrated in FIG. 7A, the temperature setpoint 702 is applicable from a 100% SOC to a 30% SOC.

However, the result of the analysis may also show that at a 30% SOC or less, the extractable energy gained by increasing the temperature of the battery from the initial temperature to the target temperature is greater than the heating energy required to increase the temperature of the battery to the target temperature. Accordingly, the temperature setpoint 704 is established at the heating temperature required to increase the battery temperature to the target temperature. As illustrated in FIG. 7A, the temperature setpoint 704 is applicable for the battery SOC of 30% or less.

FIG. 7B illustrates a different setpoint profile (at a different benchmark temperature) for the same battery. The battery may also have different voltage vs. SOC graph (not illustrated) for different benchmark temperatures. Setpoint profile 710 of FIG. 7B may be generated by performing a cost-benefit analysis similar to the analysis that was performed to generate setpoint profile 700 of FIG. 7A. However, as illustrated in FIG. 7B, setpoint profile 710 may have four temperature setpoints, 712-718.

Figure 8:
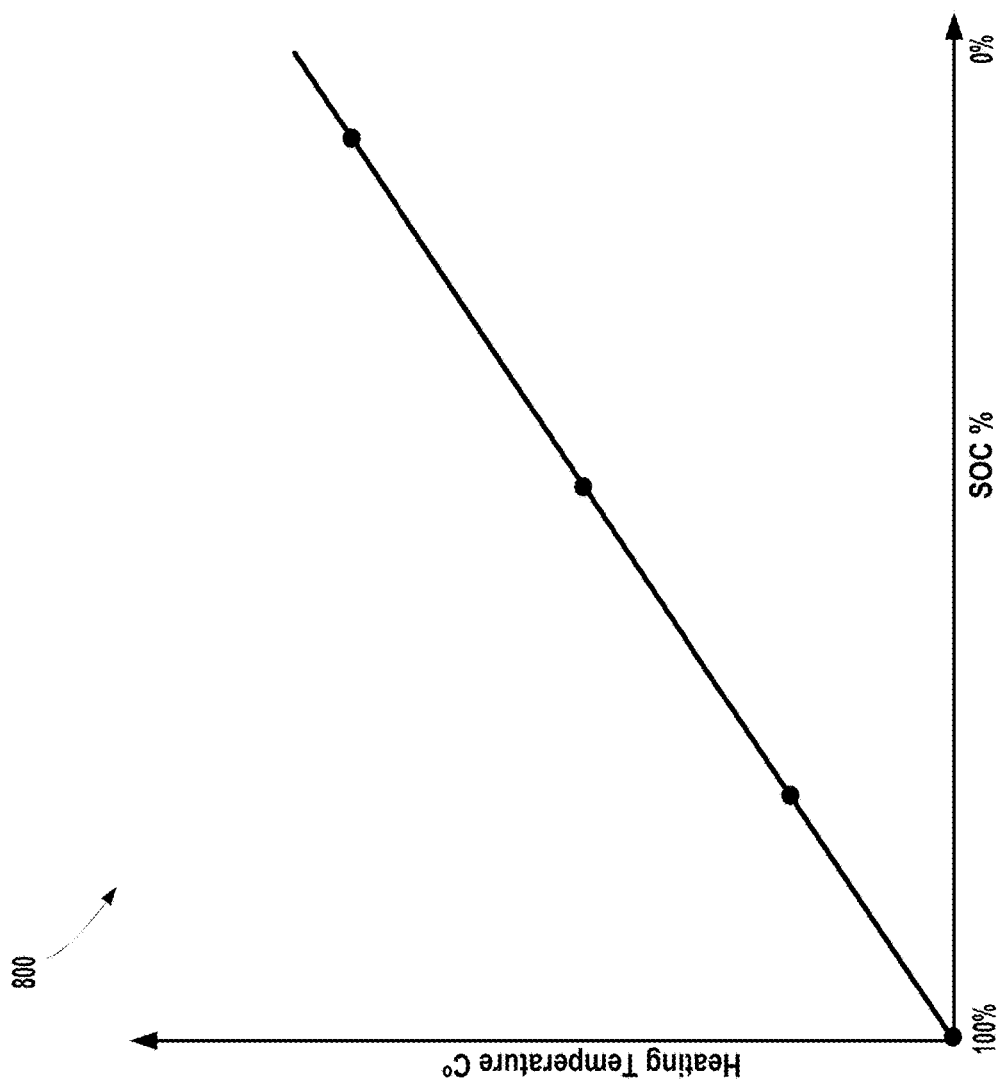
Figure 9:
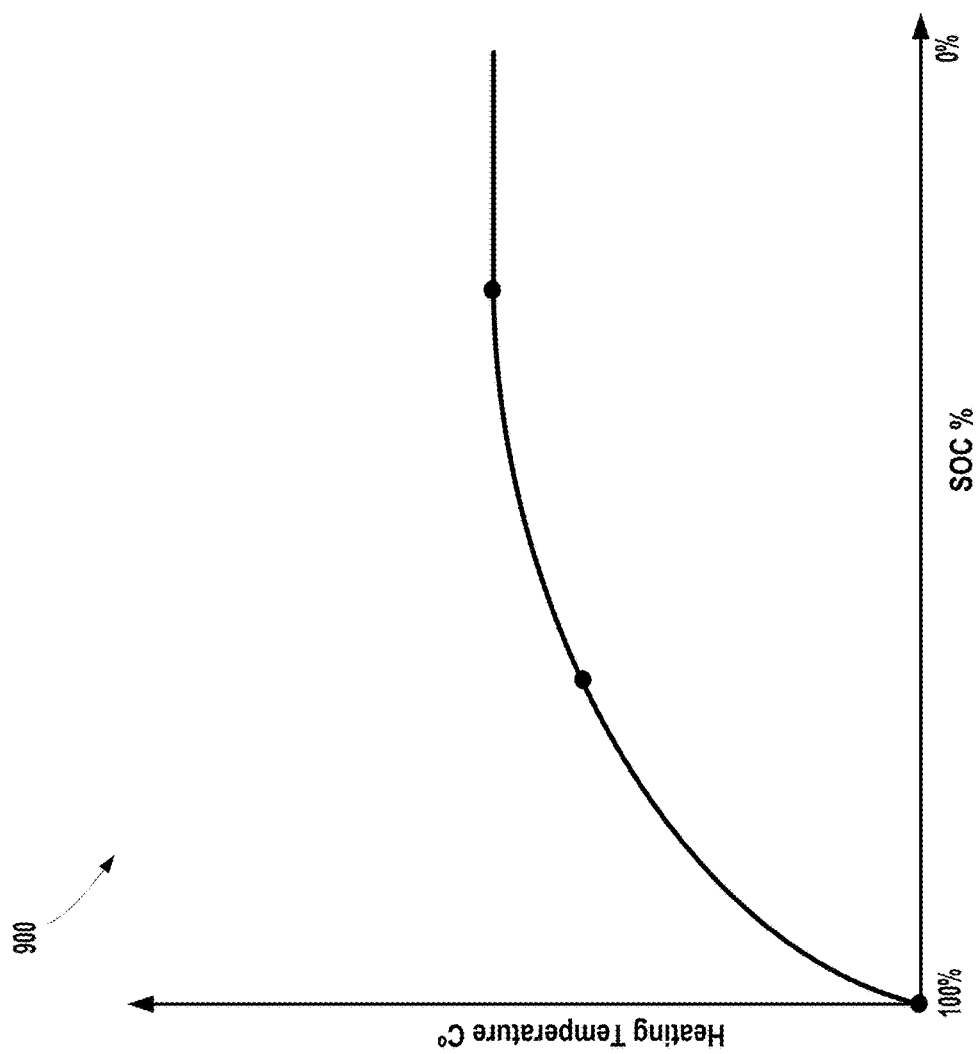

FIGS. 8 and 9 illustrate other examples of setpoint profiles, according to exemplary embodiments. As shown in FIGS. 8 and 9, the temperature setpoints may gradually increase over time as functions of SOC, whereas the profiles in FIG. 7 are step functions of SOC. In some embodiments, the plurality of setpoint profiles for a battery may be stored in memory 312 of the battery system 300.

The battery system 300 may further be operable to adjust the battery 302's temperature according to a setpoint profile for the battery 302. Within examples, the controller 308 may first generate a setpoint profile for the battery 302, as described above, before adjusting the temperature. In yet other examples, the controller 308 may retrieve a previously generated setpoint profile from the memory 312, or may receive the setpoint profile via the communication module 314.

Figure 10:
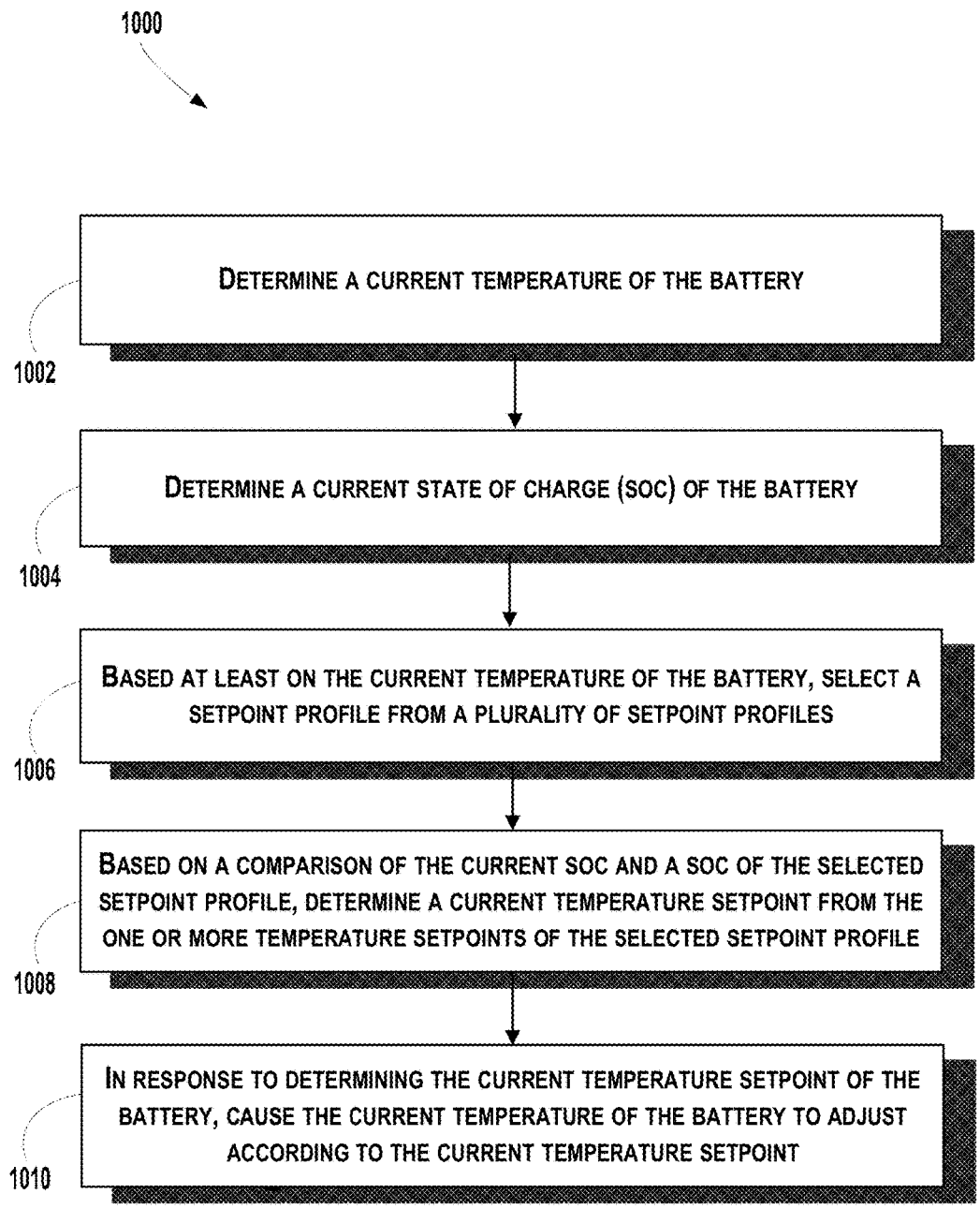
FIG. 10 illustrates a method, according to an example embodiment.

FIG. 10 illustrates a flowchart showing a method 1000 for adjusting the operating temperature of a battery, according to an exemplary embodiment. The method 1000 may be carried out by a controller of a battery system. The system may be similar or identical to system 300, as illustrated and described in reference to FIG. 3.

As shown by block 1002 and 1004, the controller may determine a current temperature and a current SOC of the battery. Further, as shown by block 1006, the system may a select a setpoint profile from a plurality of setpoint profiles. As explained above, each setpoint profile of a battery may be associated with a benchmark temperature of the battery. Accordingly, in some embodiments, the current temperature may match a benchmark temperature. In such examples, the controller may select the setpoint profile associated with the benchmark temperature that matches the current temperature. In other examples, the current temperature may not match any of the benchmark temperatures of the battery. Accordingly, the controller may round the current temperature up or down to the nearest benchmark temperature. The controller may then select the setpoint profile associated with the benchmark temperature that the current temperature was rounded to.

As explained above, a setpoint profile may be a function of SOC. Thus, the controller may compare the current SOC with a SOC of the selected setpoint profile, in order to determine a current temperature setpoint from the one or more temperature setpoints of the selected setpoint profile, as shown by block 1006. For example, the selected setpoint profile may be profile 700 illustrated in FIG. 7. In such an example, if the current SOC is greater than 30%, the controller may determine that temperature setpoint 702 is the current temperature setpoint. If the current SOC is at or less than 30%, the controller may determine that temperature setpoint 704 is the current temperature setpoint.

In response to determining the current temperature setpoint of the battery, the controller may cause the current temperature of the battery to adjust according to the current temperature setpoint. Returning to the example setpoint profile 700, the controller may determine not to activate the heating element when the SOC of the battery is at or greater than 30%. Thus, the temperature of the battery is maintained at the initial temperature. When the SOC of the battery is less than 30%, the controller may activate the heating element to increase the temperature of the battery according to the temperature setpoint 704.

Within examples, the temperature of battery 302 may be adjusted according to a predetermined setpoint profile, which may be specific to the type of battery 302. For example, the predetermined setpoint profile may specify only two temperature setpoints: a high temperature setpoint and a low temperature setpoint. Further, the setpoint profile may transition to the high temperature setpoint at a specific SOC, typically a low SOC. Accordingly, the temperature of the battery may be increased according to the high temperature setpoint only when the SOC of the battery is at or lower than the specified SOC. A cost-benefit analysis is not performed in generating such predetermined setpoint profiles.

In other examples, the controller 308 may also be configured to execute the cost-benefit analysis described above in real-time. For instance, the controller 308 may receive a target temperature as an input, and may perform a cost-benefit analysis of increasing the current operating temperature to the target operating temperature. In some embodiments, the controller may periodically run the analysis in real-time to determine whether to increase the temperature of the battery to a temperature within a range of its operating temperatures.

In other embodiments, the controller may monitor the status of the battery, such that the controller may carry out the cost-benefit analysis if certain values of the battery fall below a predefined threshold. For example, the controller may be configured to perform the cost-benefit analysis if the temperature falls below a predefined value. In other examples, the controller may be configured to run the cost-benefit analysis if the SOC of the battery falls below a predefined value. For instance, the predefined value SOC may be near a low SOC of the battery. Furthermore, the predefined values may be specific to each type of battery that may be present in a system, or they may be general values applicable to any type of battery.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A method comprising:
   determining a range of operating temperatures of a battery, wherein the range of operating temperatures comprises a plurality of benchmark temperatures;
   generating a plurality of setpoint profiles, wherein each of the setpoint profiles is associated with one of the plurality of benchmark temperatures; and
   generating one or more temperature setpoints for each of the plurality of setpoint profiles, wherein generating each of the one or more temperature setpoints comprises:
      comparing an energy required to heat the battery from an initial temperature to a target temperature with an extractable energy gained by heating the battery from an initial operating temperature to the target temperature, wherein each of the initial temperature and the target temperature is one of the range of operating temperatures of the battery.

2. The method of claim 1, wherein the extractable energy gained by heating the battery is greater than the energy required to heat the battery.

3. The method of claim 1, wherein each of the plurality of setpoint profiles specifies heating temperature as a function of state of charge (SOC).

4. The method of claim 2, wherein at least one of the plurality of setpoint profiles is an increasing function of SOC.

5. A method comprising:
   determining a current temperature of a battery;
   determining a current state of charge (SOC) of the battery;
   based at least on the current temperature of the battery, selecting a setpoint profile from a plurality of setpoint profiles for the battery, wherein each of the plurality of setpoint profiles has a temperature association, wherein each of the plurality of setpoint profiles specifies heating temperature as a function of SOC, and wherein each of the plurality of setpoint profiles comprises one or more temperature setpoints;
      based on a comparison of the current SOC and a SOC of the selected setpoint profile, determining a current temperature setpoint from the one or more temperature setpoints of the selected temperature profile; and
      in response to determining the current temperature setpoint of the battery, causing the current temperature of the battery to adjust according to the current temperature setpoint of the battery,
   wherein each of the plurality of setpoint profiles is determined based on a comparison of energy required to heat the battery to at least one of one or more operating temperatures with an extractable energy gained by heating the battery to the at least one operating temperature of the one or more operating temperatures.

6. The method of claim 5, wherein the current temperature setpoint of the battery is greater than the current temperature of the battery.

7. The method of claim 6, wherein the current temperature is a first operating temperature of the battery, and the method further includes causing a controllable heating element to heat the battery to increase the current temperature of the battery to a second operating temperature, wherein the second operating temperature is within a range of the current temperature setpoint of the battery.

8. The method of claim 7, wherein the battery operating at the first operating temperature has a first extractable energy, wherein the battery operating at the second operating temperature has a second extractable energy, and wherein the second extractable energy is greater than the first extractable energy.

9. The method of claim 8, wherein causing the heating element to increase the current temperature of the battery to the second operating temperature requires a heating energy, wherein a difference between the second extractable energy and the first extractable energy is greater than the heating energy.

10. The method of claim 5, wherein at least one of the plurality of setpoint profiles is a predetermined function of SOC.

11. The method of claim 5, wherein the method further comprises:

determining a full charge state and a minimum charge state for the battery, wherein the full charge state and the minimum charge state are a function of temperature.

12. The method of claim 1, wherein the comparing the energy is comparing a heating energy required to activate a heating element of the battery that is configured to heat the battery from an initial temperature to a target temperature with an extractable energy gained by heating the battery from the initial operating temperature to the target temperature.

13. The method of claim 12, further comprising activating the heating element when the heating energy required to increase the temperature of the battery is less than the extractable energy gained from increasing the temperature of the battery.

14. The method claim 5, wherein causing the current temperature of the battery to adjust to the current setpoint temperature further comprises activating a heating element of the battery that is configured to heat the battery from the current temperature of the battery to one of the temperature setpoints.

* * * * *